United States Patent
Ekberg et al.

(10) Patent No.: US 7,823,962 B2
(45) Date of Patent: Nov. 2, 2010

(54) BUNK ARRANGEMENT WITH PARTITION DEVICE

(75) Inventors: Tomas Ekberg, Göteborg (SE); Ulf Torgilsman, Gråbo (SE)

(73) Assignee: Volvo Lastvagnar AB, Göteborg (SE)

( * ) Notice: Subject to any disclaimer, the term of this patent is extended or adjusted under 35 U.S.C. 154(b) by 121 days.

(21) Appl. No.: 12/097,264

(22) PCT Filed: Dec. 13, 2005

(86) PCT No.: PCT/SE2005/001921
§ 371 (c)(1),
(2), (4) Date: Sep. 30, 2008

(87) PCT Pub. No.: WO2007/069947
PCT Pub. Date: Jun. 21, 2007

(65) Prior Publication Data
US 2009/0236874 A1    Sep. 24, 2009

(51) Int. Cl.
*B62D 33/06* (2006.01)
*B60R 21/06* (2006.01)
(52) U.S. Cl. ............... 296/190.02; 296/190.03; 5/118
(58) Field of Classification Search ........ 296/24.1, 296/190, 190.02, 190.03; 5/424, 425, 118, 5/9.1; 280/748, 749, 801.1; 297/487, 464, 297/468, 481
See application file for complete search history.

(56) References Cited

U.S. PATENT DOCUMENTS 5,375,879 A    12/1994    Williams et al.
6,367,839 B1    4/2002    Langhoff

FOREIGN PATENT DOCUMENTS

| EP | 1069031 A2 | 1/2001 |
| EP | 1147946 A1 | 10/2001 |
| EP | 1384621 A2 | 1/2004 |
| EP | 1522487 A1 | 4/2005 |
| FR | 2859432 A1 | 3/2005 |
| WO | 0216172 A1 | 2/2002 |

OTHER PUBLICATIONS

Supplemental European Search Report for corresponding EP 05 81 6442.
International Search Report from corresponding International Application No. PCT/SE2005/001921.

*Primary Examiner*—Lori L Lyjak
(74) *Attorney, Agent, or Firm*—WRB-IP LLP

(57) ABSTRACT

A bunk arrangement including a partition device is providing which is especially suitable for use as a sleeping or storing compartment in a vehicle, especially a truck or a bus. In one alternative, the bunk arrangement includes a partition device with a partition wall with a plurality of wall elements, which are provided for folding together and defolding the wall, for retracting and extending it, respectively, and holding and guiding means for holding the partition wall and for guiding the same between a retracted and an extended state.

6 Claims, 7 Drawing Sheets

BUNK ARRANGEMENT WITH PARTITION DEVICE

BACKGROUND AND SUMMARY

The invention relates to a bunk arrangement comprising a partition device, especially for a sleeping or storing compartment in a vehicle, especially a truck or a bus. The invention further relates to a vehicle cabin comprising such a bunk arrangement.

The cabin especially of a track or a bus is usually equipped with at least one bunk arrangement or sleeping compartment in which the driver or an assistant driver can rest or sleep during a journey so that stops on a journey can be kept at a minimum and the driver and the assistant driver need not to leave the vehicle in order to sleep over night.

Furthermore, if not used for sleeping or resting, such a bunk arrangement or sleeping compartment can usually be used for storing objects or articles. However, in both cases it is desired to have a partition device delimiting the bunk arrangement against other areas of the cabin in order to improve the comfort for a person who is resting on the bunk or in order to avoid that stored objects or articles fail down from the bunk arrangement and hurt the driver or the assistant driver during driving.

EP 1 069 031 discloses a hunk arrangement which comprises a bunk with a free edge with substantially vertically extending safety belts, which are attached to the ceiling of a cabin, and a safety net which is guided and locked by means of a horizontal net rod along the safety belts. Furthermore, at a free edge of the bunk a cartridge is provided enclosing a spring biased shaft for roiling up the safety net when releasing the same for shifting it into its downward position.

EP 1 147 946 discloses a safety net arrangement for a bunk in which the safety net is provided at its free (forward) end with a net tube with attachments for suspending the net in the cabin. Net belts which are fastened to the net tube and the net extend under the bunk and are attached at the back of the wall of the cabin. Furthermore, elastic means are provided at the backward end of the net for withdrawing it under the bunk when the net is released from its suspension. Both these arrangements are relatively expensive in manufacturing and mounting because they comprise several single pans which have to be assembled.

It is desirable to provide a bunk arrangement according to the introductory part above which comprises a partition device and which can be manufactured and assembled in a quick and easy manner.

Furthermore, it is desirable that a bunk arrangement comprising a partition device shall be provided, which can be manually operated in a quick and simple way and is reliable in use.

According to a first aspect of the present invention, a bunk arrangement comprising a partition device is provided with a partition wall with a plurality of wall elements, which are provided for folding together and defolding the wall for retracting and extending it, respectively, and holding and guiding means for holding the partition wall and for guiding the same between a retracted and an extended state.

According to a second aspect of the present invention, a bunk arrangement comprising a partition device is provided with a partition wall with a free upper and a lower edge, and a retracting device comprising an actuation means, mounted within or under a bunk of the bunk arrangement for drawing the partition wall at least partly into or under the bunk when the partition wall is released from a suspension.

An advantage of these aspects is that the partition device can be used as a separation wall and as a safety wall for delimiting the bunk arrangement and for avoiding that stored objects or articles fail down from the bunk arrangement.

DESCRIPTION OF THE DRAWINGS

Further details, features and advantages of the invention are disclosed in the following description of exemplary and preferred embodiments of the invention in connection with the drawings in which shows.

DETAILED DESCRIPTION

Figure 1:
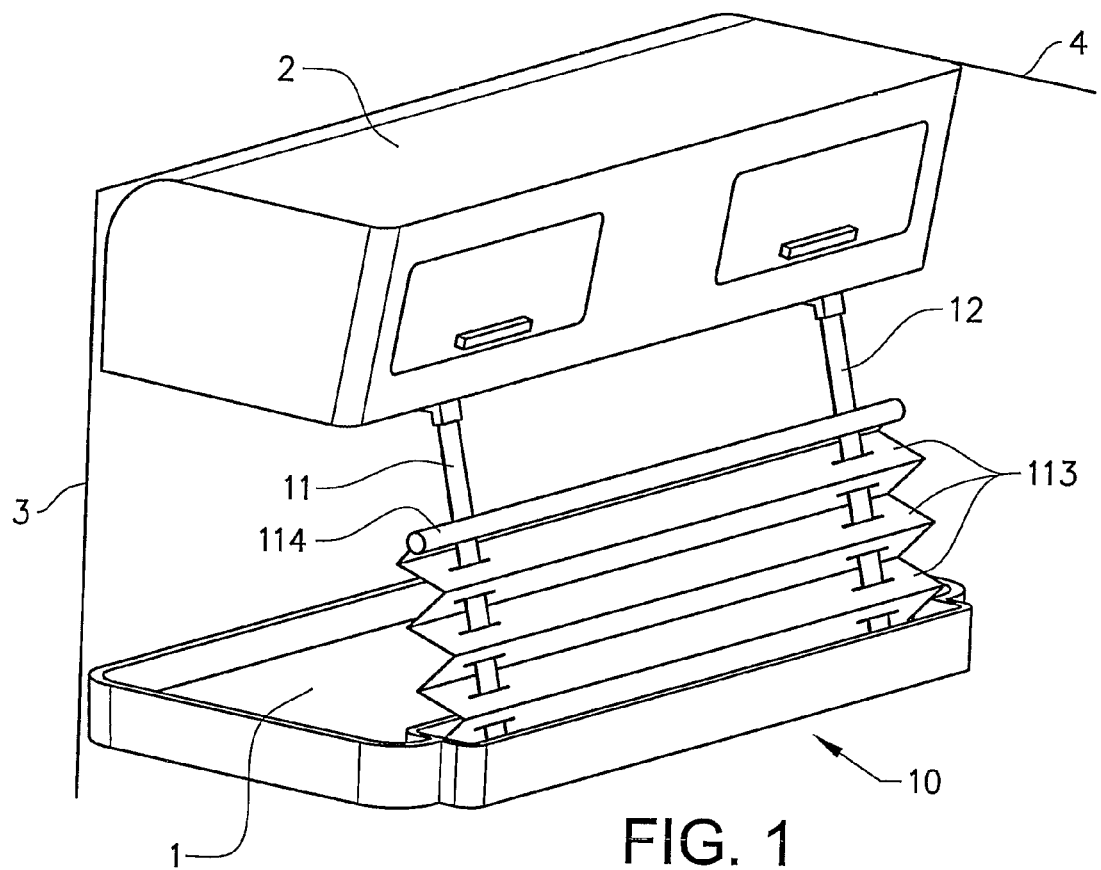
FIG. 1 a schematic three-dimensional view into the rear part of a cabin of a truck or bus comprising a bunk arrangement or sleeping compartment with a partition device according to a first embodiment of the invention in a first variation.

FIG. 1 shows a view into the rear part of a cabin having a back wall 3 and a ceiling 4 at which a luggage compartment 2 is mounted. Below the luggage compartment 2 a bunk arrangement or sleeping compartment comprising a sleeper berth or bunk 1 is provided for the driver and/or the assistant driver, respectively, for resting or sleeping during a journey or for storing objects or articles.

The bunk 1 is fastened with a first longitudinal edge at the back wall 3 of the cabin. The bunk arrangement is provided with a partition device comprising a partition wall 10 (or separation or safety wall) which preferably extends from the opposite and tree second longitudinal edge of the bunk 1 upwardly and is guided and held by means of holding and guiding means preferably in the form of a first and a second belt 11, 12. As can be seen as well in FIG. 2 which is a side view from the left in FIG. 1, the belts 11, 12 are attached according to a first variation of the first embodiment with their first upper ends at the luggage compartment 2.

The wall 10 can be manufactured from one or more of a plurality of different materials in dependence on the desired properties and functions to be obtained. If for example the wall 10 is provided for hiding objects or articles which are stored on the bunk 1 and/or for keeping the compartment behind the wall 10 dark, the material is preferably opaque. For obtaining a fire protection, for preventing that a person or objects which are lying on the bunk 1 can fall down from the bunk 1 in case of an emergency brake or a collision, and/or for other functions and purposes, the material has to be chosen primarily with respect to an appropriate strength.

The wall 10 is manufactured for example from a polyester fabric with a thickness of between about 0.7 mm and about 1.2 mm which is usually strong enough for most of the above functions and purposes. Furthermore, such a polyester fabric is easy to clean as well.

Figure 2:
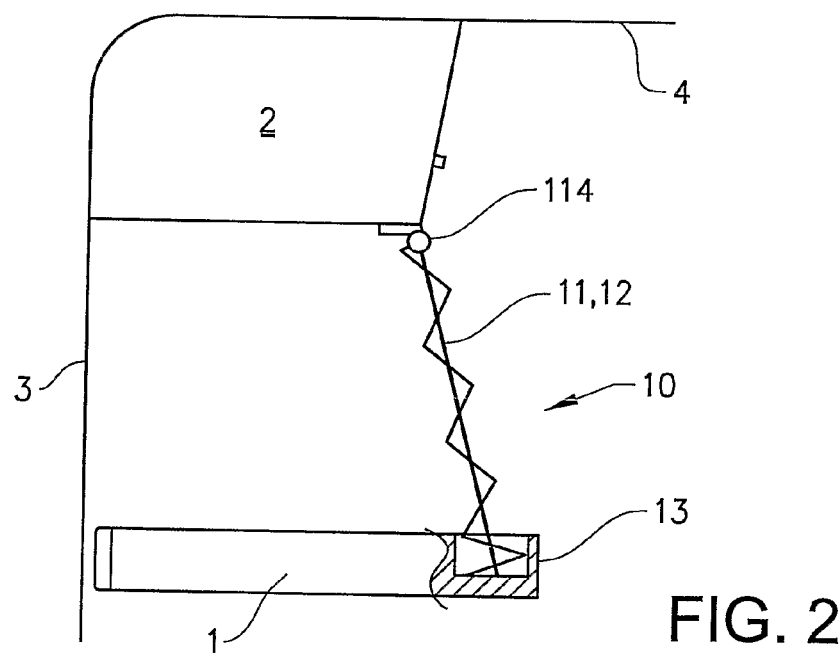
FIG. 2 a side view of the arrangement from the left in FIG. 1.

According to FIGS. 1 and 2, the wall 10 comprises a plurality of wall elements 113. Preferably the wall 10 is provided substantially in the form of a jalousie with a plurality of longitudinal elements 113 which extend along the length of the wall 10 and which provide a zigzag form in the direction of the height of the wail 10. The belts 11, 12 are guided through slits within the elements of the wall 10 so that when shifting the wall 10 down, the wall elements 113 are folded together in a zigzag manner.

If one or both belts 11, 12 are inclined relative to the extension of the longitudinal elements 113 (e.g. if the first upper end of one or both belts 11, 12 is attached at a side wall of the cabin instead of at the luggage compartment 2), the slits within the elements 113 have a corresponding length so that the wall 10 can be pulled up (i.e. extended) and shifted down as well. The longitudinal elements 113 can be swivelling linked together as especially indicated in FIG. 7, or the elements 113 are single elements as in case of a usual jalousie.

An advantage of such a wall 10 is that it can be used as well to replace a usual curtain which is provided for dividing a known partition device from other parts of a cabin.

For receiving the elements 113 of the wall 10 in its downshifted position, the free second edge of the bunk 1 is provided with a receptacle preferably in the form of a cassette 13 with a substantially rectangular cross section which is indicated in FIG. 2. The partition wall 10 can be retracted by folding it into the receptacle 13 and it can be extended by defolding or pulling it out of the receptacle 13.

The belts 11, 12 are attached with their second lower ends at the foot of the partition wall 10 and especially within the receptacle 13.

Preferably, the strengths of the attachments of the belts 11, 12 at the luggage compartment 2 and in the receptacle 13, as well as the strengths of the belts 11, 12 themselves are dimensioned such that they fulfill the requirements for achieving the function of safety belts for preventing that a person or objects which are lying on the bunk 1 can fall down in case of an emergency brake or a collision.

The upper free end of the wall 10 is provided with a tube or rod 114 by which the wall 10 can be pulled up (and down) by hand along the belts 11, 12 until reaching the luggage compartment 2 as shown in FIG. 2, and by which the wall 10 can be fixed in this or in any intermediate position between the receptacle 13 and the luggage compartment 2 by means of clamping devices (not shown) which are effective between the tube or rod 114 and the belts 11, 12.

Figure 3:
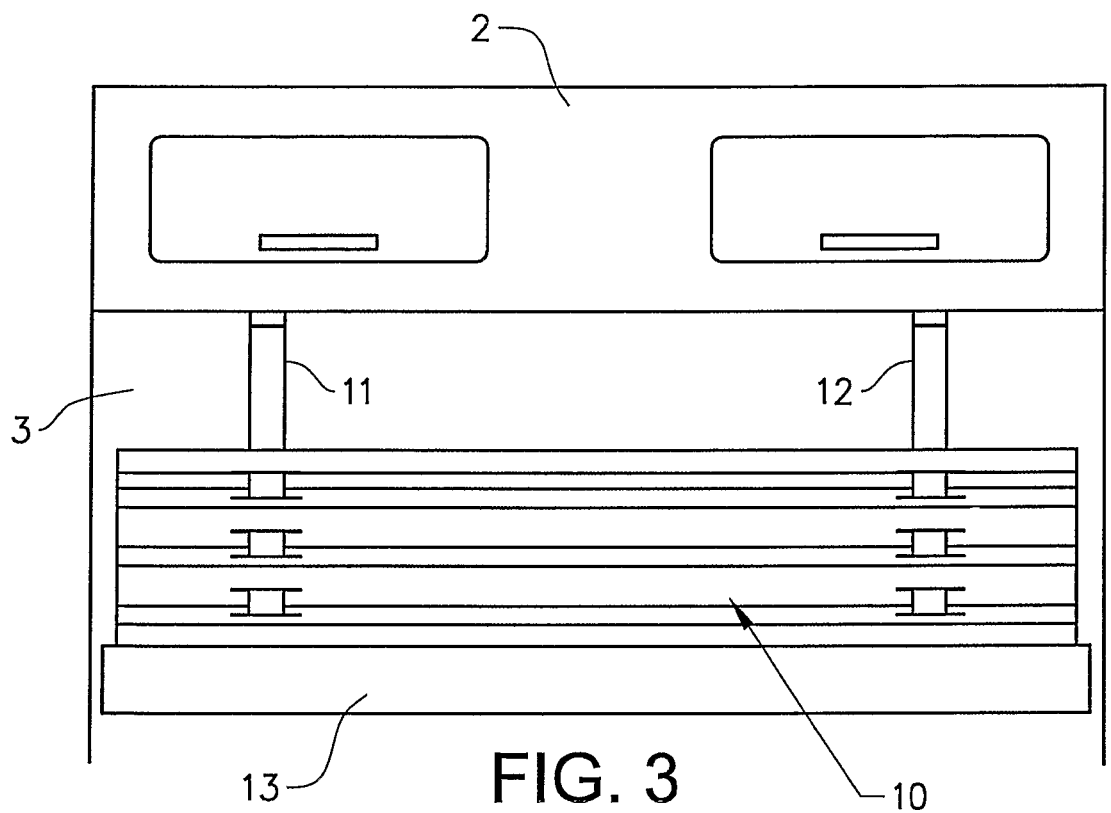
FIG. 3 a first front view of the arrangement of FIG. 1.

FIG. 3 shows a front view onto the wall 10 and the luggage compartment 2. The wall 10 is drawn partly out of the receptacle 13 up to an intermediate position at about a half of the height between the receptacle 13 and the luggage compartment 2. Furthermore, the belts 11, 12 are shown in this Figure which are again attached with one end within the receptacle 13 and with the other end at the luggage compartment 2.

Figure 4:
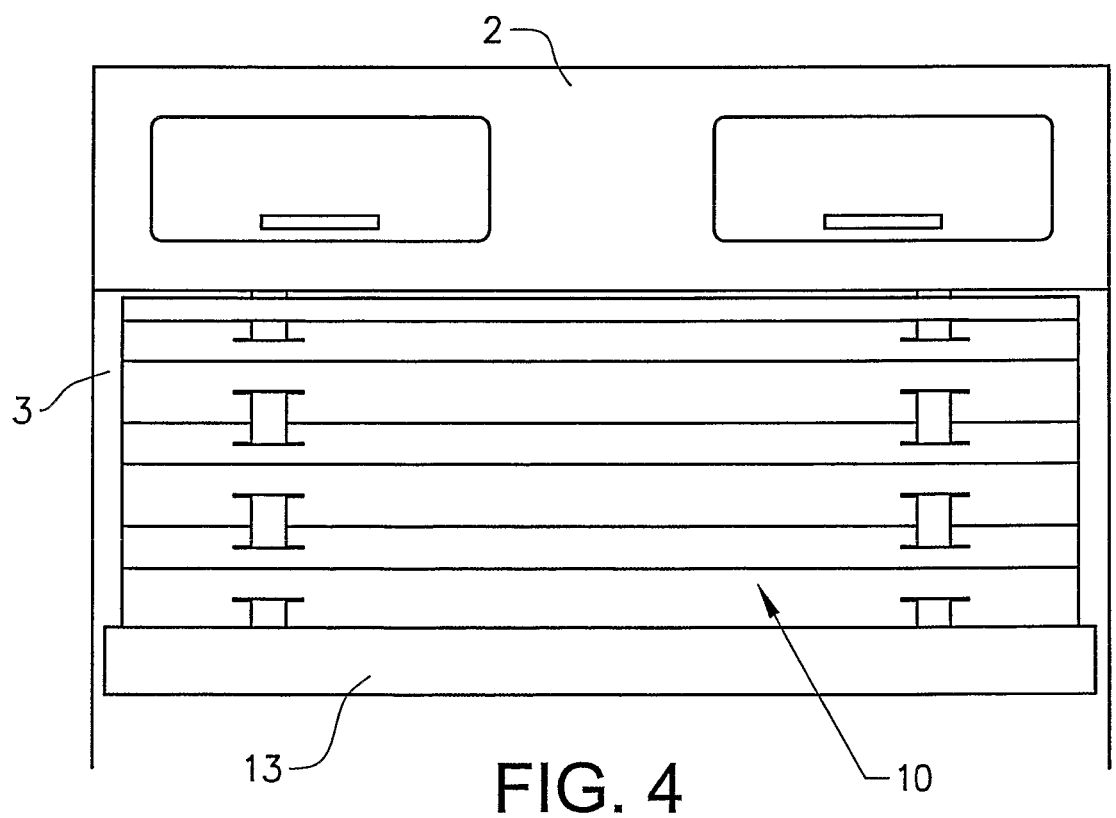
FIG. 4 a second front view of the arrangement of FIG. 1.

FIG. 4 shows the same view as in FIG. 3, however, the wall 10 is pulled up to the luggage compartment 2 so that the bunk arrangement behind the wall 10 is closed against the front part of the cabin.

Figure 5:
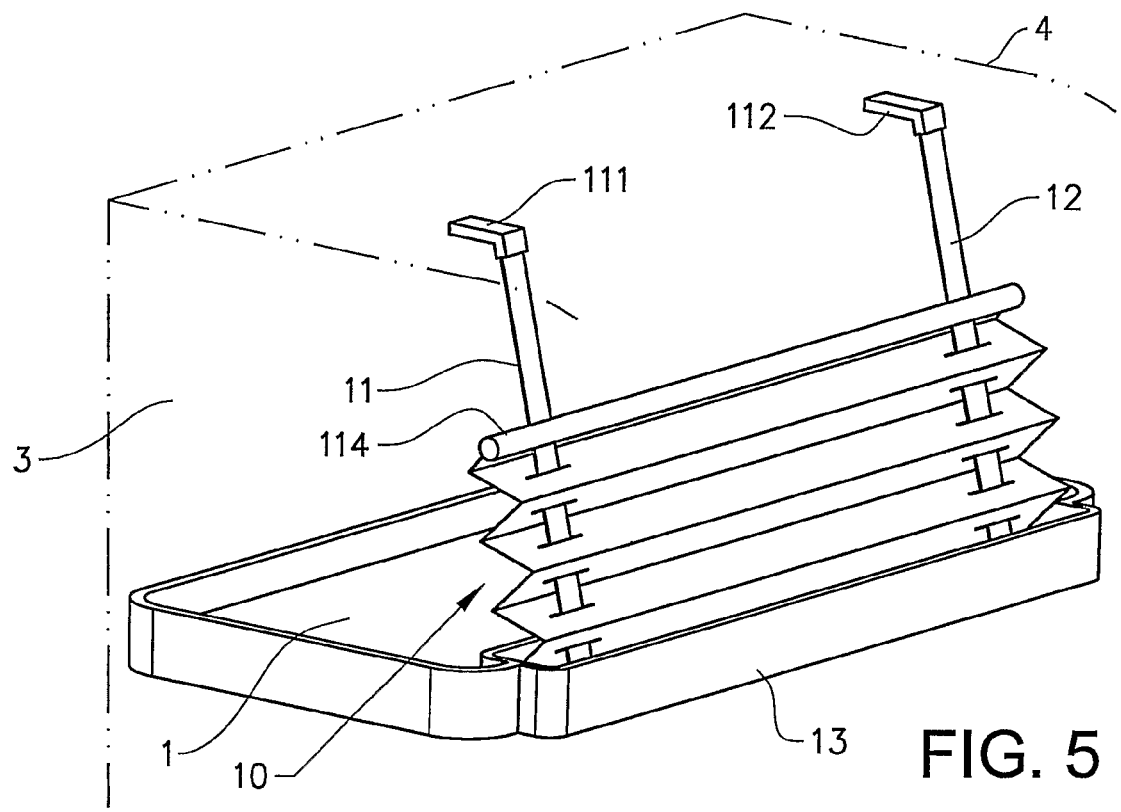
FIG. 5 a three-dimensional view of a bunk arrangement according to the first embodiment of the invention in a second variation.

FIG. 5 shows a schematic three-dimensional view into the rear part of a cabin of a truck or bus with a bunk arrangement or sleeping compartment comprising a partition device with a partition wall 10 (or separation or safety wall) according to a second variation of the first embodiment of the invention. Equal or corresponding parts as in FIGS. 1 to 4 are denoted by the same reference signs.

The bunk arrangement again comprises a bunk 1 which is fastened with a first longitudinal edge at a back wall 3 of the cabin and which comprises at the opposite free second longitudinal edge a receptacle 13 in the form of a cassette for enclosing the elements 113 of the wail 10 which can be pulled out of the receptacle 13 and fixed at holding and guiding belts 11, 12 as explained above.

Figure 6:
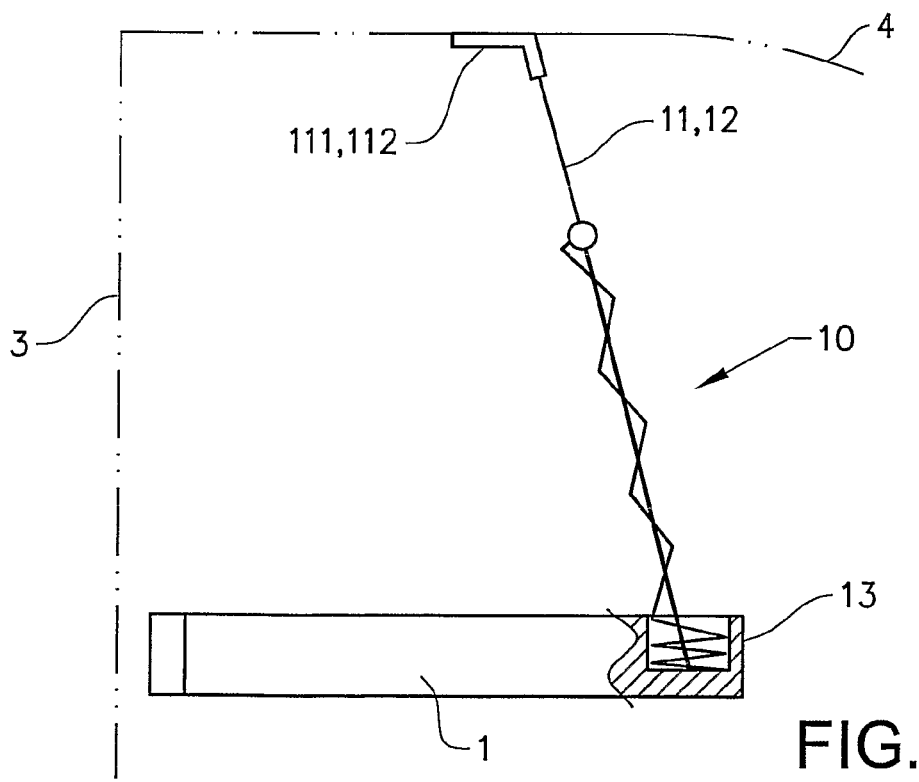
FIG. 6 a side view of the arrangement from the left in FIG. 5.

In contrary to the first variation, the belts 11, 12 are attached with their first upper ends at fastening means 111, 112 at the ceiling 4 of the cabin. Consequently, the height of the wall 10 is preferably dimensioned such that it can be pulled up to the ceiling 4 so that the bunk arrangement can be closed. The side view according to FIG. 6 from the left side in FIG. 5 shows the wall 10 pulled up into an intermediate position between the receptacle 13 and the ceiling 4.

In both the first and the second variations the belts 11, 12 are preferably provided as well for holding and carrying the free second longitudinal edge of the bunk 1 and not only as safety belts and for holding and guiding the wall 10.

Figure 7:
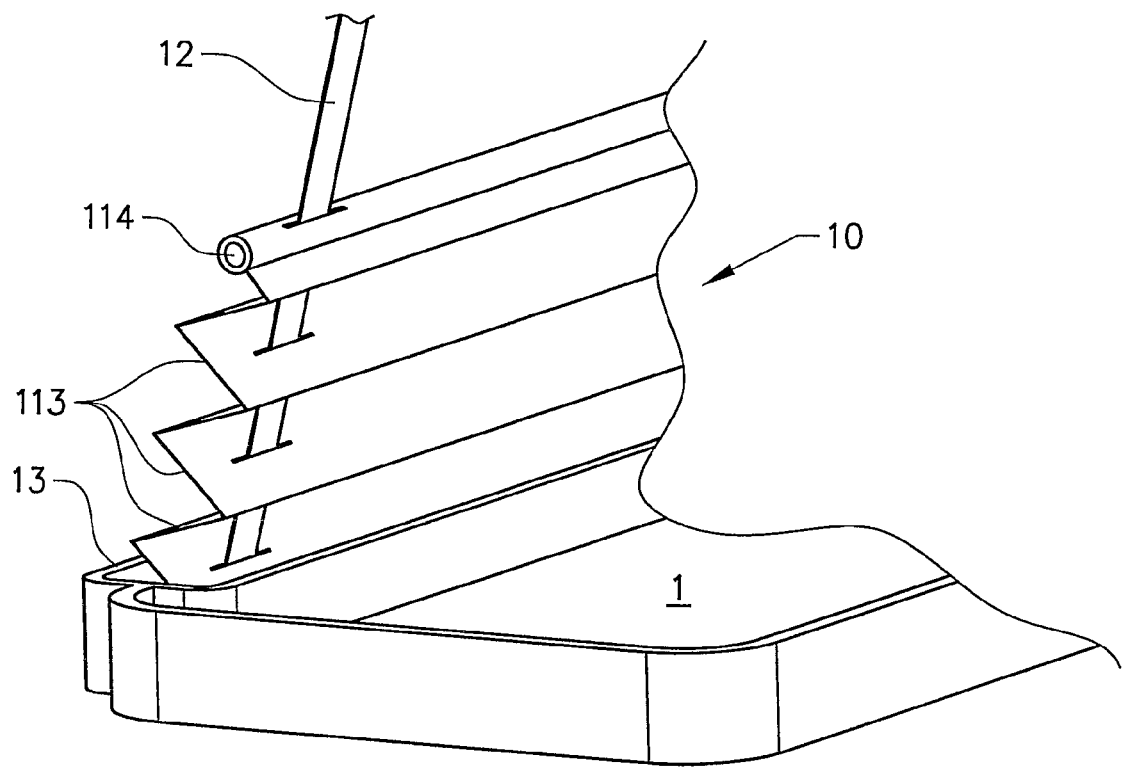
FIG. 7 a detailed three-dimensional view of parts of a bunk and the partition device according to the first embodiment of the invention.

Furthermore, only one or more than two belts can be provided in dependence on their strengths and the load effected by the bunk 1. The positions of the belts along the length of the wall 10 are substantially selected such that a person can get onto the bunk 1 in a comfortable manner. FIG. 7 shows a more detailed view of the right side end portion of the bunk 1 (in which a mattress has been removed) and the wall 10 together with the second belt 12. As indicated in this Figure, the receptacle 13 is formed at the free second longitudinal edge of the bunk 1 with a substantially U-shaped cross-section.

Furthermore, this Figure shows in more details the wall 10 comprising a plurality of longitudinal elements 113 which when shifting down the wall 10 are folded together into the receptacle 13. The opposite upper edge of the wall 10 is provided with the tube or rod 114 which provides a termination of the wall 10 and makes handling of the wall 10 easier, especially when pulling if up and shifting if down. This tube 114 preferably also comprises clamping means for fixing the wall in an intermediate position at the belts 11, 12.

Figure 8:
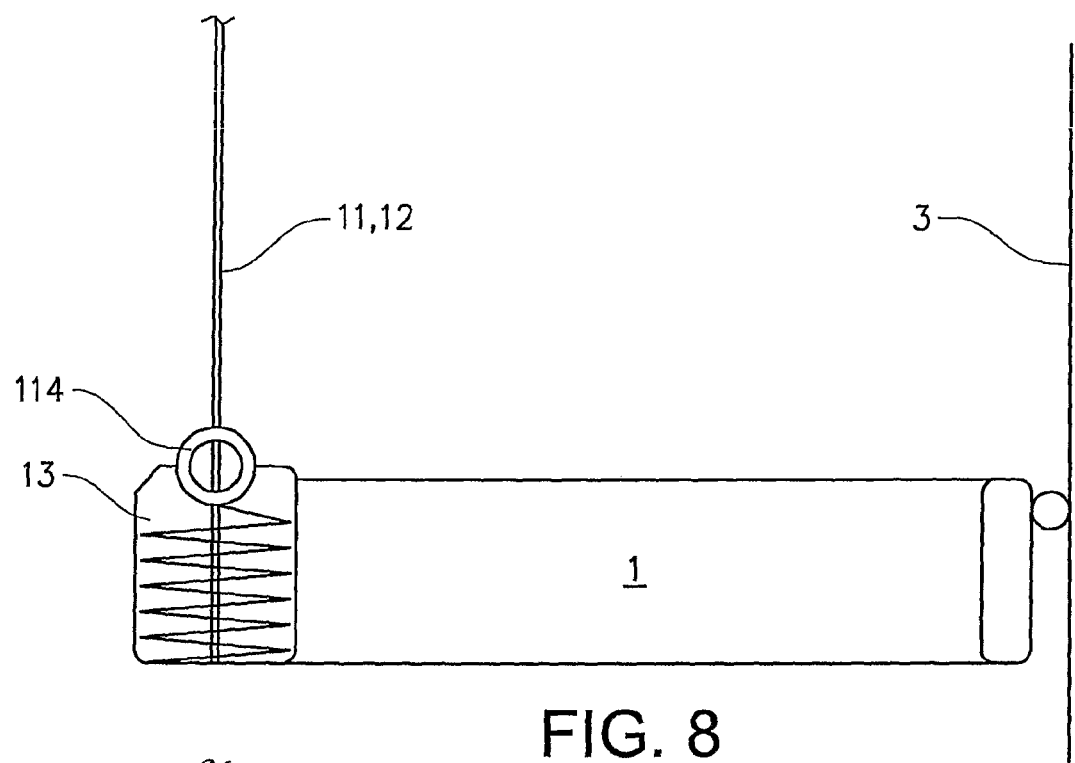
FIG. 8 a first detailed side view from the right in FIGS. 1 and 5.
Figure 9:
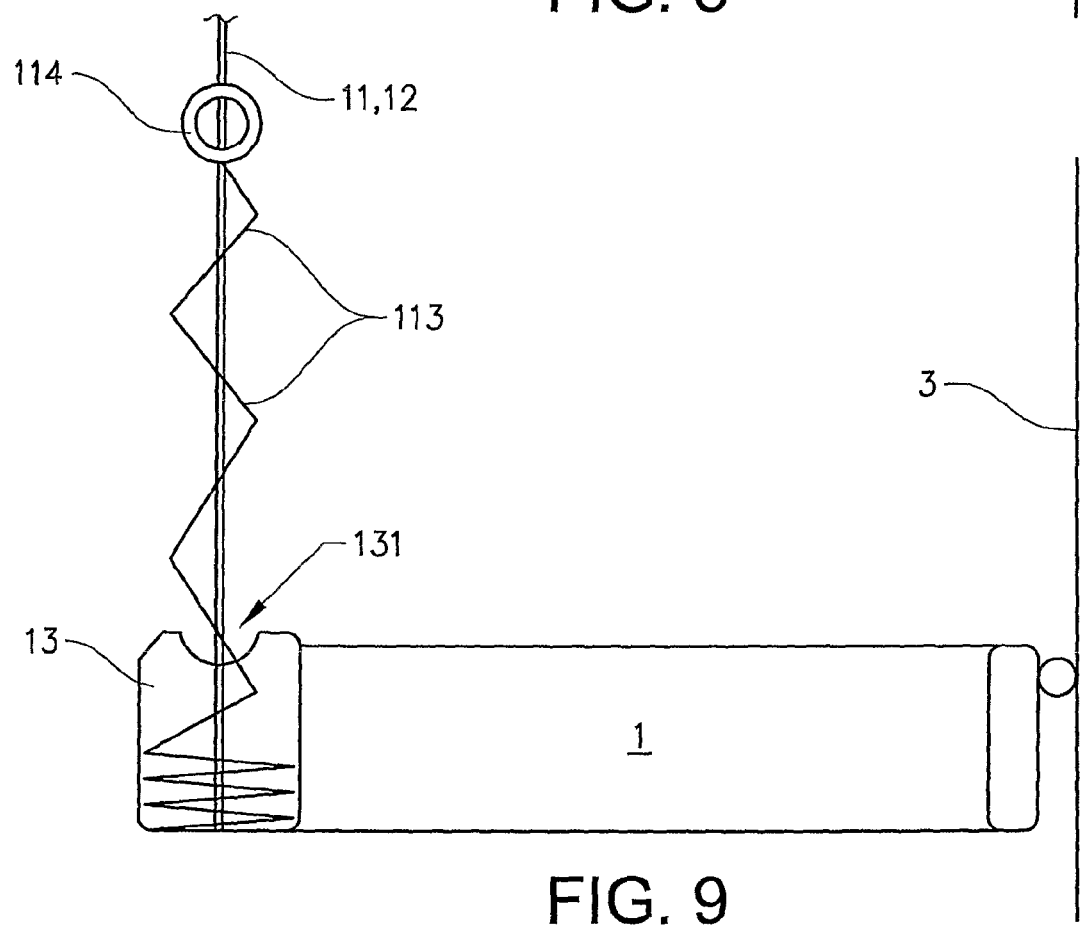
FIG. 9 a second detailed side view from the right in FIGS. 1 and 5.

FIG. 8 shows a side view from the right in FIG. 1 or 5 in which the back wall 3 of the cabin, the bunk 1 with the receptacle 13 at the free second longitudinal edge of the bunk 1 and the belts 11, 12 are indicated. In this Figure the wall 10 is shifted into its down most position in which the elements 113 of the wall 10 are folded above each other and are enclosed entirely within the receptacle 13. Furthermore, the rube or rod 114 which terminates the wail 10 at its upper edge is positioned on the opening of the receptacle 13 so that if closes the same. For this purpose the upper surface of the receptacle 13 comprising the opening for receiving the elements 113 is provided with a groove 131 (see FIG. 9) running along its length which is formed to receive at least a part of the rod or tube 114 so that it can lie in it and closes the opening when the wall 10 has been shifted into its retracted state.

FIG. 9 again shows the side view of FIG. 8 in which the wall 10 has been pulled out of the receptacle 13 partly so that some of the elements 113 of the wall 10 are de-folded and some of the elements 113 are still enclosed within the receptacle 13. As mentioned above, the rod or tube 114 is preferably provided to fix the wall 10 in a desired position by means of clamping means which are effective between the rod or tube 113 and the belts 11, 12. FIGS. 10 to 13 show a second embodiment of the invention in three variations in which instead of the receptacle 13 the partition wall 10 is retracted into a space under or within the bunk 1. This embodiment is especially provided for a wall 10 in the form of e.g. a net or a fabric or any other material which is flexible or can be rolled, curved or bent, or is suitable in another way, for being drawn into or under the bunk 1.

Figure 10:
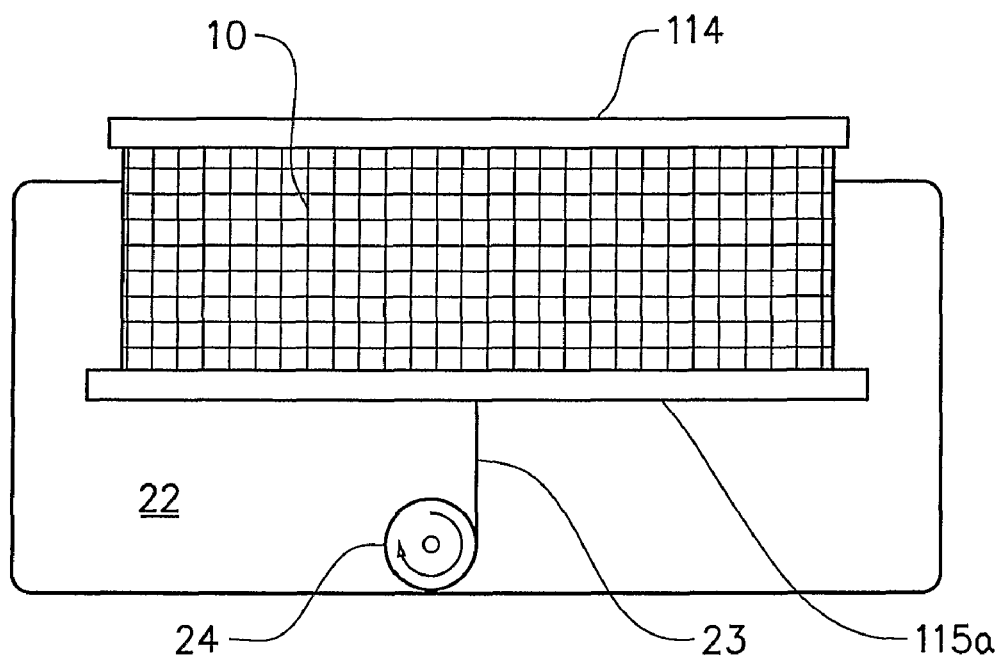
FIG. 10 a schematic top view of a partition device according to a second embodiment of the invention in a first variation.

FIG. 10 shows a plan view into the space within (or under) a bunk 1. The wall 10 is terminated at its upper free edge with a first tube or rod 114 as described above with respect to the first embodiment. However, in contrary to the first embodiment, this second embodiment of the partition device does not comprise any belts 11, 12 or other guiding means for the partition wall 10. Instead, the first tube or rod 114 is provided preferably for being hooked into a related upper attachment or suspension at or above the bunk arrangement.

Furthermore, the opposite lower edge of the wall 10 is drawn into or under a bunk 1 of the bunk arrangement by means of a retracting device 23, 24 comprising an actuation means, which is mounted within or under the bunk 1 and is connected with the lower edge of the partition wall 10 for drawing the same at least partly into or under the bunk 1 when the wall 10 is released from its suspension.

According to a first variation, the wall 10 is provided at its opposite lower edge which lies within or under the bunk, with a second tube or rod 115a at which a wire or line 23 is attached. This wire or line 23 is wound on a turning roll 24 which is actuated by a spiral spring (not shown) and which is rotatably mounted at the downside of the bunk or between a lower part 22 and an upper part 21 of the bunk. When releasing the wall 10 from a suspension (not shown), the roll 24 is driven by the spring force so that the wire or line 23 is turned onto the roll 24 and the wall 10 is drawn into the space within or under the bunk 1.

Figure 11:
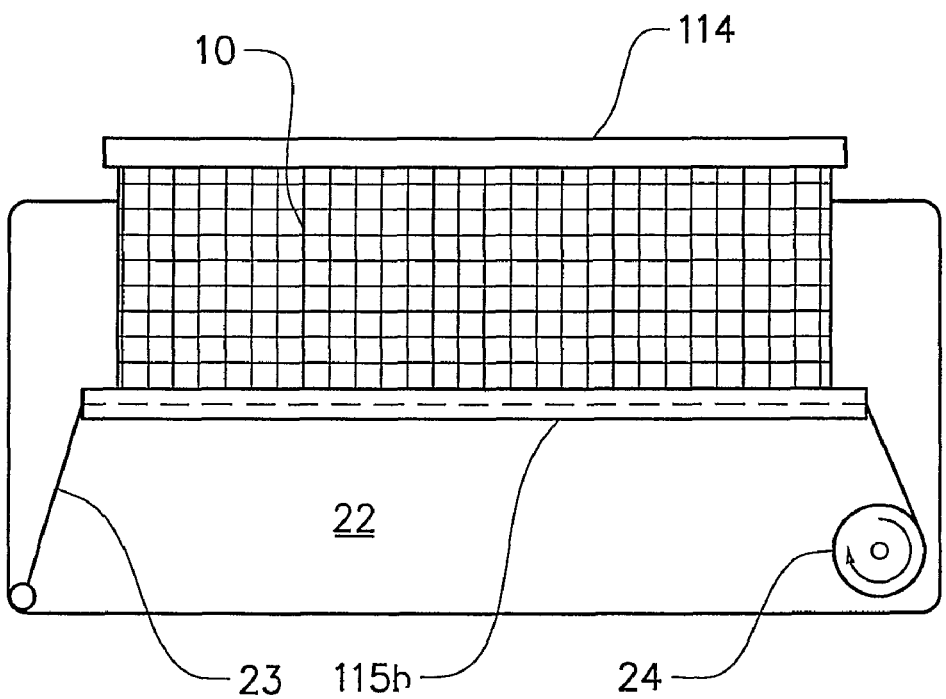
FIG. 11 a schematic top view of the second embodiment of the invention in a second variation.

FIG. 11 shows a plan view into the space within (or under) a bunk 1 of a second variation of the second embodiment. The same parts as in FIG. 10 are again denoted with the same reference signs. The wall 10 is again provided at its upper free edge with a first tube or rod 114 as described above. According to this second variation the wall 10 is provided at its opposite lower edge lying within or under the bunk 1 with a second tube or rod 115b which is a hollow element so that a wire or line 23 for retracting the wall 10 can be guided through the tube or rod 115b.

More in details, a first end of the wire or line 23 is attached within or under the bunk at its inner or back side. The wire or line 23 runs through the second tube or rod 115b and is guided around a spring biased roil 24 which is again driven by the force of a spiral spring (not shown) and is rotatably mounted under the bunk or between a lower part 22 and an upper part 21 of the bunk 1 as described above and indicated in FIG. 10.

Figure 12:
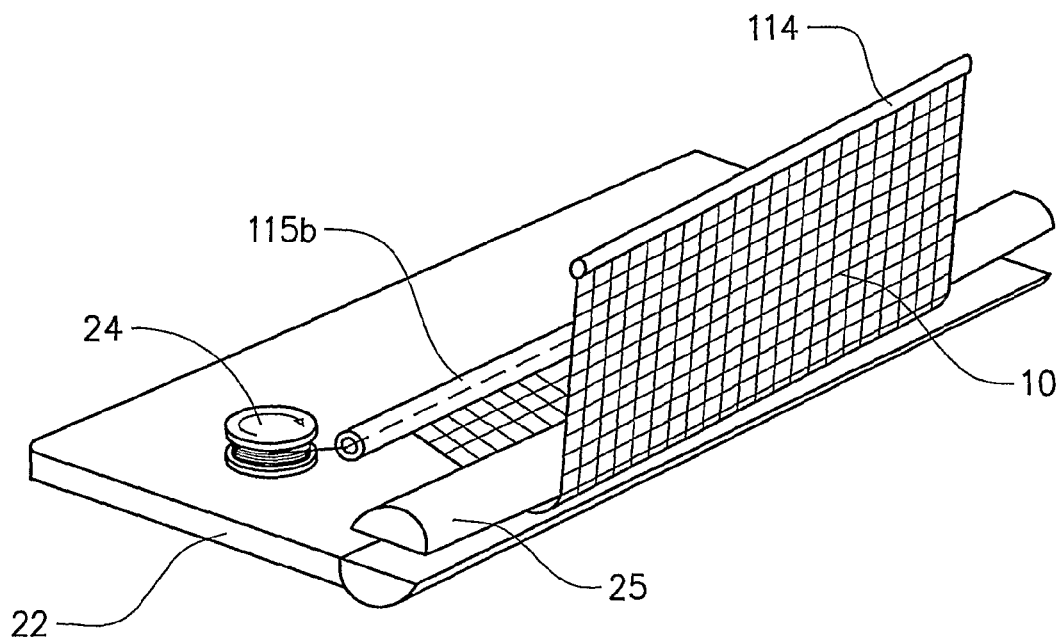
FIG. 12 a schematic three-dimensional view of the second embodiment.

FIG. 12 shows a three-dimensional view into the space within a bunk 1 (the upper part 21 being removed) in which the roll 24 comprising the spiral spring, and the second hollow tube or rod 115b are indicated together with the wall 10 which comprises at its upper tree edge the first tube or rod 114. Preferably the wall 10 is guided out of the space within the bunk 1 around a longitudinal cylinder 25 which extends substantially along the free second longitudinal edge of the bunk 1.

Figure 13:
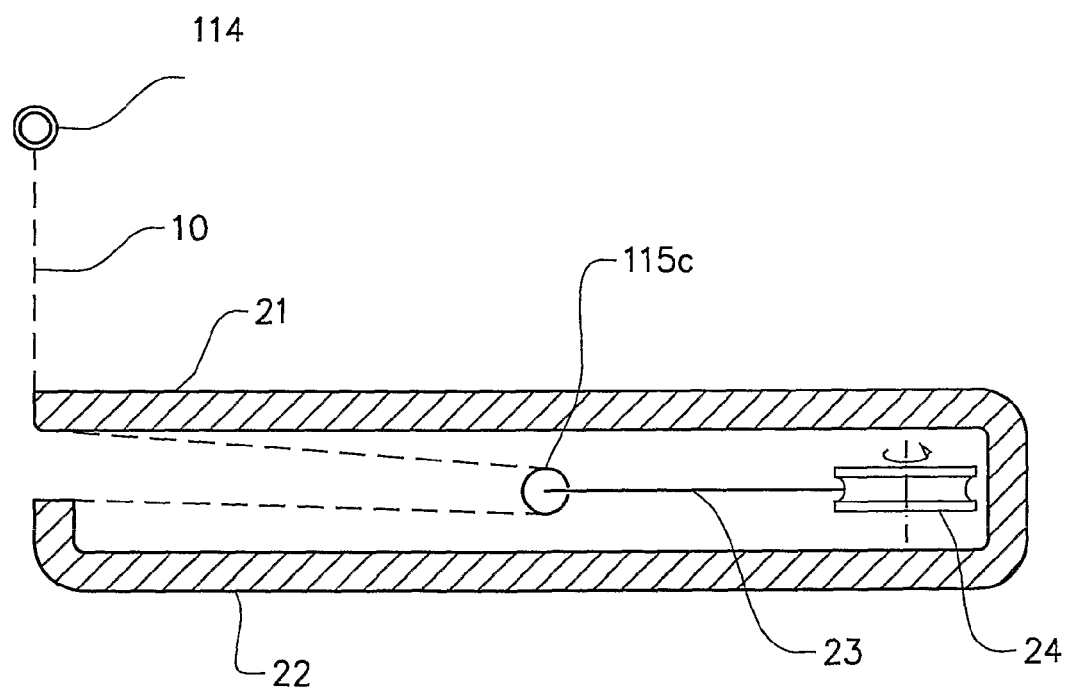
FIG. 13 a schematic side view of the second embodiment of the invention in a third variation.

FIG. 13 shows a third variation of the second embodiment in a cross-section through a bunk 1 having an upper part 21 and a lower part 22 between which the space within the bunk 1 is delimited for retracting the partition wall 10 (which is again preferably a net). The wall 10 is drawn through an opening along the free second longitudinal edge of the bunk 1. The roil 24 is rotatably mounted within the space of the bunk 1 in the region of its first longitudinal edge and again driven by the force of a spiral spring.

In contrary to the first and second variation, in this third variation the wall 10 is attached with its lower edge at the lower part 22 of the bunk 1, in the region of the free second longitudinal edge of the bunk 1. From there, the wall 10 is guided over a tube or rod 115c to the outside of the bunk. The tube or rod 115c itself is drawn by means of a wire or line 23 and an actuated roll 24 as described with respect to the second variation according to FIGS. 11 and 12. This third variation is especially advantageous in case of a bunk 1 with a small width in relation to a wall 10 in the form of a fabric or net with a large height, or generally in case of a wall 10 having a large height.

Finally, the roll 24 according to the second embodiment can be actuated or driven for drawing the wall 10 into or under the bunk 1 as well by means of an electromotor or another actuation means which instead of a spiral spring turns the roll 24.

The invention claimed is:

1. Bunk arrangement comprising a partition device, the partition device comprising:
    a partition wall with a free upper and a lower edge, and
    a retracting device comprising an actuation means, mounted within or under a bunk of the bunk arrangement for drawing the partition wall at least partly into or under the bunk when the partition wall is released from a suspension,
    wherein the retracting device comprises a roll, which is actuated and rotatably mounted in or under the bunk for winding up a wire or line which is attached with one end at the bunk and which is guided through a hollow tube or rod, and wherein the partition wall is attached with its lower edge at the bunk and guided around the hollow tube or rod to the outside of the bunk, for drawing the partition wall at least partly into or under the bunk.

2. Bunk arrangement according to claim 1, wherein the partition wall is made from a net or a fabric or a material which is flexible and can be rolled, curved or bent for being drawn into or under the bunk.

3. Bunk arrangement according to claim 1, wherein the actuation means comprises a spiral spring which is included within the roll and provided for turning the roll.

4. Bunk arrangement according to claim 1, wherein the actuation means comprises an electromotor which is included within the roll and provided for turning the roll.

5. Bunk arrangement according to claim 1, wherein a rod or tube is provided at the upper edge of the partition wall for fixing the wall in an extended state at an upper suspension.

6. Vehicle cabin comprising a bunk arrangement according to claim 1.

* * * * *